United States Patent [19]
Anderko

[11] Patent Number: 5,811,704
[45] Date of Patent: Sep. 22, 1998

[54] GUITAR PRACTICE DEVICE

[76] Inventor: Wayne T. Anderko, 3914 Highway Ave., Highland, Ind. 46322

[21] Appl. No.: 845,001

[22] Filed: Apr. 22, 1997

Related U.S. Application Data

[60] Provisional application No. 60/016,038 Apr. 23, 1996.
[51] Int. Cl.$^6$ ................................................. G09B 15/00
[52] U.S. Cl. .............................. 84/470 R; 84/291; 84/287
[58] Field of Search .................................. 84/470 R, 291, 84/173, 273, 287, 297 R, 298, 299, 295

[56] References Cited

U.S. PATENT DOCUMENTS

| D. 38,682 | 7/1907 | Stahl | D17/19 |
|---|---|---|---|
| D. 77,401 | 1/1929 | Elliot | D17/19 |
| 1,839,244 | 1/1932 | Meisel | 84/263 |
| 1,848,920 | 3/1932 | Watson | 84/173 |
| 2,222,959 | 11/1940 | Stathopoulo | 84/267 |
| 2,295,902 | 9/1942 | Kass | 84/455 |
| 3,494,240 | 2/1970 | Laselva et al. | 84/291 |
| 3,589,062 | 6/1971 | Desmond | 446/405 |
| 3,736,830 | 6/1973 | Ledford | 84/285 |
| 4,024,787 | 5/1977 | Larson | 84/743 |
| 4,067,255 | 1/1978 | Camaioni | 84/322 |
| 4,122,804 | 10/1978 | Cecchini | 84/173 |
| 4,135,431 | 1/1979 | Ferguson | 84/329 |

FOREIGN PATENT DOCUMENTS 68068  7/1992  Germany .

*Primary Examiner*—William M. Shoop, Jr.
*Assistant Examiner*—Shih-yung Hsieh
*Attorney, Agent, or Firm*—Gary M. Hartman; Domenica N. S. Hartman

[57] ABSTRACT

A practice device (10) that allows a musician to practice the specific skills of picking and plucking strings without producing any significant level of sound, such that the user can practice his or her playing technique without being distracted or concerned with the sound produced. The device (10) generally includes a solid, nonresonant body (12) having a front surface (14), an oppositely-disposed rear surface (16), and a short handle (38) that enables the device (10) to be firmly held and stabilized with one hand while being picked with the other hand. A pair of blocks (18, 20), roughly equivalent to a guitar bridge and headstock, are spaced apart on the front surface (14) of the device (10), and strings (28) extend in parallel between the blocks (18, 20) across the body (12) of the device (10). The strings (28) are spaced apart and securely held above the front surface (14) of the device (10) substantially identically to a conventional guitar. However, the blocks (18, 20) secure the strings (28) in a manner that damps vibration in the strings (28) when plucked, so as to absorb sound that would otherwise be produced when the strings (28) are plucked. A sound-damping material (44) is preferably disposed between the strings (28) and at least one of the blocks (18, 20) in order to further promote damping of vibration and absorption of sound. The level of sound produced by the device (10) is sufficiently low so as not to disturb others nearby, thereby drastically increasing the opportunities for practice.

20 Claims, 2 Drawing Sheets

GUITAR PRACTICE DEVICE

CROSS REFERENCE TO RELATED APPLICATIONS

This application claims the benefit of U.S. Provisional Application No. 60/016,038, filed Apr. 23, 1996.

BACKGROUND OF THE INVENTION

1. Field of the Invention

The present invention generally relates to stringed musical instruments. More particularly, this invention relates to a device that enables one to practice his or her guitar picking skills without producing any significant level of sound, such that the user can practice his or her playing technique without being distracted or concerned with the sound produced.

2. Description of the Prior Art

Conventional acoustic guitars typically have a hollow, resonant body with a round sound hole, a fretted neck projected longitudinally from one end of the body, and six or twelve strings running from the end, or top, of the neck to the opposite end of the body. The strings are fastened at the top of the neck with tuning screws, and to the body with a bridge mounted to the surface of the body, referred to as a sound board. In this manner, the strings span the sound hole, such that plucking the strings with one hand produces a resonant sound within the body cavity, while the player's other hand is used to stop the strings at the appropriate frets to produce the desired pitch for each string played. The same playing technique is entailed with an electric guitar, though these guitars differ from acoustic guitars by having a solid, nonresonant body with an electric pickup instead of a sound hole.

For one to excel at playing a guitar, mastery of two separate skills—plucking the strings and fingering the neck—is necessary. However, each of these skills requires concentrated and independent practice directed specifically toward the particular skill. Accordingly, it would be desirable if a device were available that enabled a musician or music student to practice the skill of plucking the strings of a guitar without concern for fingering notes and chords and without producing any significant level of sound, such that he or she can practice his or her plucking technique without being distracted or concerned with the sound produced, and without disturbing others nearby.

SUMMARY OF THE INVENTION

It is an object of this invention to provide a practice device that enables a guitar musician to focus on his or her plucking skills without being distracted by fingering notes and chords and by the sound produced by the strings.

It is a further object of this invention that the device produces only minimal sound, so that the musician is able to practice his or her plucking technique under circumstances that would otherwise preclude practice with a conventional guitar.

It is another object of this invention that such a device has a feel similar to that of a guitar.

In accordance with a preferred embodiment of this invention, these and other objects and advantages are accomplished as follows.

In accordance with this invention, optimum practice for picking and plucking a guitar generally occurs when a musician is not distracted by concern for simultaneously fingering notes and chords or by the sound produced by the plucked strings. On the basis of this observation, the present invention provides a practice device that allows a musician to practice the specific skills of picking and plucking strings without producing any significant level of sound, such that the user can practice his or her playing technique without being distracted or concerned with the sound produced. In addition, the level of sound is sufficiently low so as not to disturb others nearby, thereby drastically increasing the opportunities for practice.

Generally, the device includes a solid body having a front surface, an oppositely-disposed rear surface, and a short handle that enables the device to be firmly held and stabilized with one hand while being picked with the other hand. A pair of blocks, together roughly the equivalents of a guitar bridge and headstock, are spaced apart on the front surface of the device, and strings extend in parallel between the blocks across the body of the device. The strings are spaced apart and securely held above the front surface of the device substantially identical to a conventional guitar. However, the blocks secure the strings in a manner that damps vibration in the strings when plucked, so as to absorb sound that would otherwise be produced when the strings are plucked. A sound-damping material is preferably disposed between the strings and at least one of the blocks in order to further promote damping of vibration and absorption of sound.

With the above construction, the device of this invention allows a musician to concentrate solely on his or her picking and plucking skills without the distraction associated with the conventional requirement to simultaneously finger the strings when playing a conventional guitar. The device lacks frets and is otherwise not configured to permit the strings to be stopped to vary the pitch of each string played. Accordingly, a musician is able to focus on his or her plucking skills without being distracted by fingering notes and chords. Furthermore, because little sound is produced as a result of the manner in which the strings are secured to the solid body with the blocks, the device provides greater opportunities to practice the specific skills of picking and plucking strings that would not be otherwise available due to circumstances where the sound produced during practice would disturb others.

Another significant advantage of this invention is its uncomplicated and compact design, which is contrary to conventional guitar designs that are largely dictated by concerns for the instrument's sound production quality. Therefore, the device can be manufactured to have a simple construction that allows for greatly increased durability over conventional guitars, which tend to be rather fragile. As a device dedicated solely to the practice of picking technique, complex design and manufacturing practices that are motivated by sound quality are unnecessary. Consequently, the overall manufacturing costs and the subsequent consumer cost of this invention are considerably lower than conventional guitars. Finally, the relatively smaller size of the device promotes its convenience, particularly when the use of a conventional guitar would be impractical.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 1:
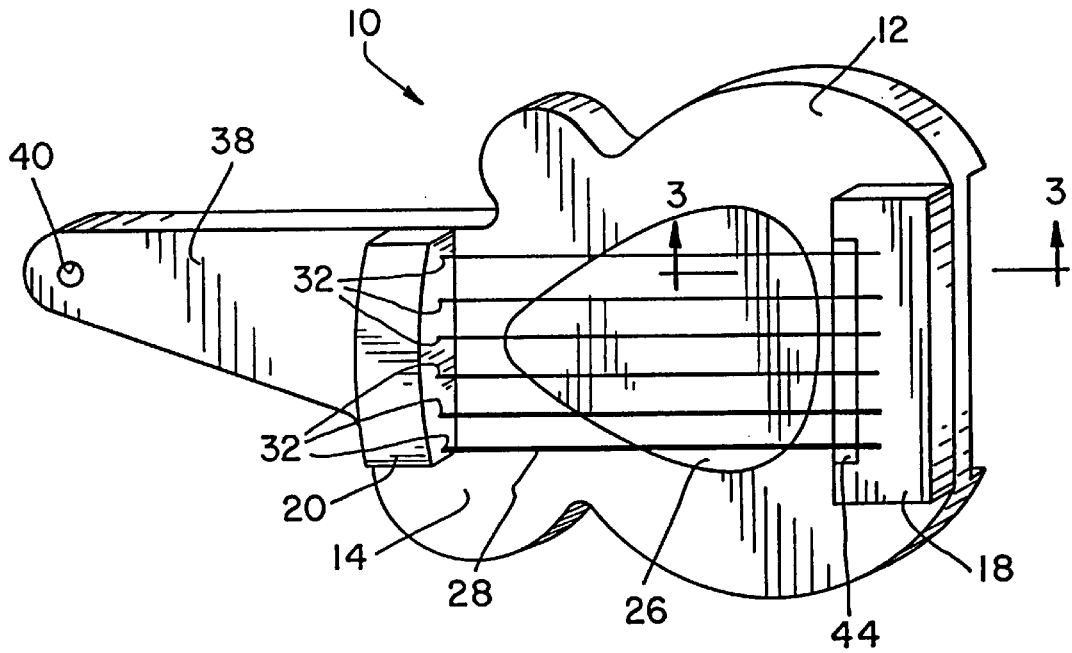
FIG. 1 shows a front perspective view of a guitar practice device in accordance with a preferred embodiment of the present invention.
Figure 2:
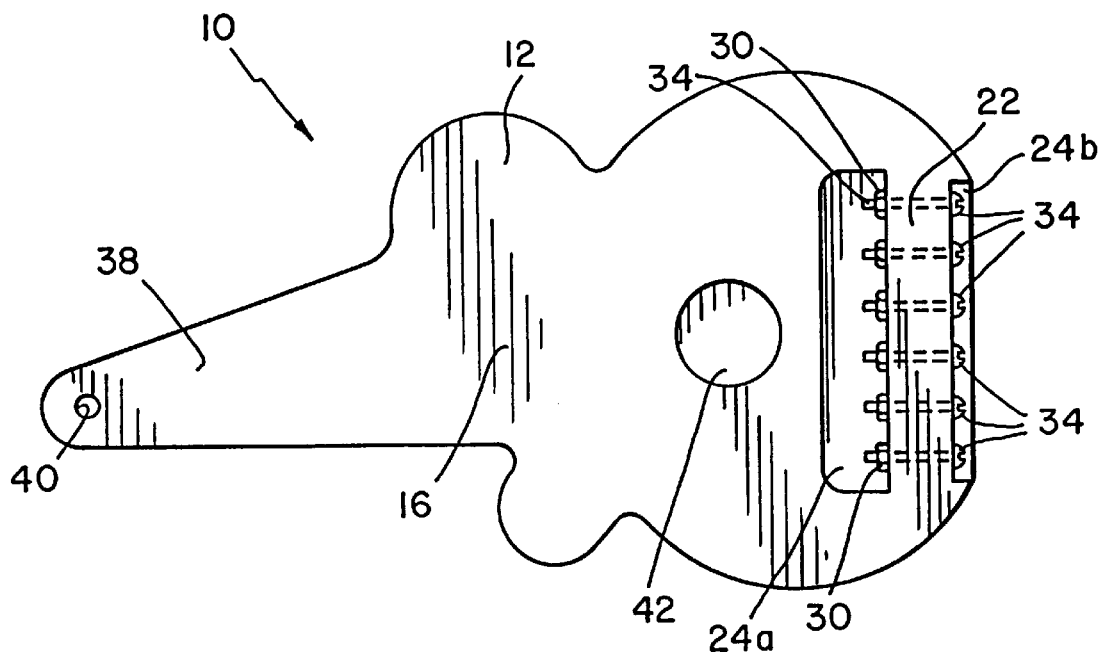
FIG. 2 shows a rear plan view of the practice device of FIG. 1.
Figure 3:
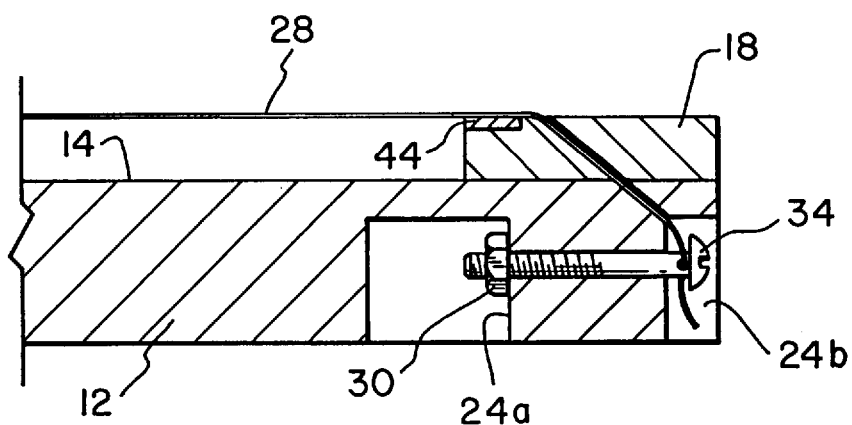
FIG. 3 is a cross-sectional view of the practice device of FIG. 1 through section line 3—3.

Shown in FIGS. 1 through 3 is a guitar practice device 10 in accordance with a preferred embodiment of the invention. The device 10 includes a body 12 that, for aesthetic and functional purposes, has a shape similar to certain guitars known in the industry. The body 12 generally has a front surface 14 shown in FIG. 1, a rear surface 16 shown in FIG. 2, and a tapered neck 38 projecting in a longitudinal direction from the body 12. The neck 38 is sufficiently long to enable a user to firmly grip the device 10, but preferably not so long as to make the device 10 awkward to handle or store. As shown in FIGS. 1 and 2, a suitable length for the neck 38 is roughly one-half the length of the entire device 10. The neck 38 is shown as including a hole 40 with which a cord (not shown) can be attached to facilitate transport or storage of the device 10.

Attached to the front surface 14 is a pair of blocks, one designated as a bridge block 18 and the other a head block 20. The blocks 18 and 20 are both attached to the front surface 14 and spaced apart from each other in the longitudinal direction of the body 12. The blocks 18 and 20 can be attached to the body 12 by screws or by any other suitable manner, such as an adhesive. The body 12 and the blocks 18 and 20 may be individually made from wood or other suitable material, though it is foreseeable that the body 12 and blocks 18 and 20 could be molded to have a unibody construction from various materials.

With further reference to FIG. 1, parallel guitar strings 28 run in the longitudinal direction of the body 12 between the blocks 18 and 20. While the device 10 is shown with six strings 28, twelve strings could be provided to simulate a twelve-string guitar. String holes 32 extend through the head block 20 in the longitudinal direction of the body 12, with each string 28 being secured to the head block 20 within one of the corresponding holes 32. For this purpose, each string 28 may be terminated with its standard peg (not shown), such that the ends of the strings 28 are prevented from being pulled through their respective holes 32. Notably, because the head block 20 is not located on the neck 38, the strings 28 do not span the surface of the neck 38, eliminating the traditional requirement for frets spaced along the length of the neck 38. Consequently, the neck 38 can be used solely for supporting the device 10, and there is no provision for the user to practice fingering notes and chords.

The opposite ends of the strings 28 extend through the bridge block 18 to the rear surface 16 of the body 12, where the strings 28 are secured with nuts 30 and bolts 34. As seen in FIGS. 2 and 3, each bolt 34 extends longitudinally through a bar 22 formed in the body 12 between two recesses 24a and 24b in the rear surface 16 of the body 12. As shown in FIG. 3, each of the strings 28 is threaded through a lateral hole through one of the bolts 34. From their locations in the bridge block 18 at the front surface 14, the strings 28 extend at an angle through the bridge block 18 and body 12 to an interior corner formed by the bar 22 near the heads of the bolts 34. The benefit to this arrangement is that the user is able to place the heel of his or her hand directly on the strings 28 when picking, as is done with conventional guitars. By turning the bolts 34 and then tightening the nuts 30, the tension in each string 28 can be individually modified as needed to simulate the tension of the strings of a conventional guitar. If so desired, the nuts 30 and bolts 34 may be concealed by attaching a coverplate (not shown) to the rear surface 16 of the body 12.

Referring again to FIG. 1, the device 10 is shown to include a damping material 44 at the edge of the bridge block 18 nearest the head block 20. The damping material 44 can be of any suitable type capable of physically damping the vibration of the strings 28, and therefore damping and absorbing the sound produced when the strings 28 are picked. As used herein, damping materials 44 are nonresonant, porous and/or air-permeable materials that use air or another fluid as a sound-absorbing medium, with suitable examples being cloth and foamed plastic or elastomeric materials. As can be seen in FIG. 1, the damping material 44 is provided on the bridge block 18 in a manner that causes the strings 28 to contact the material 44, while the bolts 34 ensure that the strings 28 are taut against the material 44, compressing the material 44 between the strings 28 and the bridge block 18 to achieve the desired damping effect. Notably, the body 12, blocks 18 and 20, and bolts 34 are functional by themselves as sound-damping structures by the manner in which they secure the strings 28, because vibration in the strings 28 is damped by the contact between the strings 28 and the blocks 18 and 20, and absorbed by the solid, nonresonant body 12. However, the desired damping effect is considerably promoted by the presence of the damping material 44, which further reduces the level of sound produced by the strings 28 to a level that is nearly imperceptible by the user and others nearby. Though shown on the bridge block 18, it is foreseeable that the damping material 44 could be provided on the head block 20, or on both the bridge and head blocks 18 and 20.

The device 10 of this invention is also shown as including a pickguard 26 attached to the front surface 14 of the body 12 and between the blocks 18 and 20. The pickguard 26 primarily serves to protect the front surface 14 from damage during use, particularly if the body 12 is made from wood or other material that can be easily dented or scratched. In the preferred embodiment, the pickguard 26 is formed of plastic, though it is foreseeable that other materials could be used. As shown, the pickguard 26 overlays a hole in the body 12, such that a cavity 42 is formed which is accessible from the rear surface 16 of the body 12. The cavity 42 enables objects to be stored within the body 12, and is ideally suited for storing several guitar picks.

From the above, it can be appreciated that various benefits of the device 10 are attributable to its construction and uncomplicated design. The device 10 lacks a hollow body necessary to produce a readily audible resonant sound, and secures the strings 28 in such a manner as to absorb the vibrations of the strings 28 when plucked. As a result, a musician is able to concentrate on the skills necessary for effective picking or plucking of the strings 28 without being distracted by the sound or tone quality produced. This aspect of the invention is also advantageous because it enables the device 10 to be conveniently used in situations where a conventional guitar would be unacceptable or impractical. From this standpoint, the above-described construction of the device 10 has the particular characteristic of producing very little sound, to the extent that the sound produced by the strings will be nearly imperceptible by the user and others nearby. Notably, this aspect of the invention is greatly facilitated by the presence of the damping material 44 on the bridge block 18. An additional benefit of its construction is that the device 10 does not entail a hollow body, sound hole, tuning screws or a fretted neck as do conventional guitars, and therefore is characterized by relatively low production costs, particularly because its design and manufacturing considerations do not include sound quality, which is a critical consideration in the production of conventional guitars.

Another advantage of this invention is that the device 10 can be securely held with the neck 38, which provides a convenient and natural location to grasp the device 10 with the user's free hand. Because the neck 38 extends longitudinally relative to the body 12, the user can grasp the device 10 in a similar manner as that when a conventional guitar is played. In effect, the shape of the body 12 and the placement of the neck 38 enable the device 10 to achieve a "feel" that is similar to a conventional guitar, which is an important consideration when desiring to transpose the skills practiced with the device 10 to a conventional guitar. This aspect of the invention also promotes the aesthetic value and subsequent marketability of the invention.

While the invention has been described in terms of a preferred embodiment, it is apparent that other forms could be adopted by one skilled in the art. For example, the shape of the body 12 and the construction of the individual components of the device 10 could be modified, and appropriate materials could be substituted for those noted. Accordingly, the scope of the invention is to be limited only by the following claims.

What is claimed is:

1. A practice device comprising:
a body having a surface, the body lacking a sound hole and lacking an electric pickup at the surface;
a neck extending from a first end of the body;
strings disposed above the surface of the body;
first means for securing a first end of each string to the body near the neck;
second means for securing an oppositely-disposed second end of each string to the body near a second end of the body;
means for adjusting tension of the strings; and
means for simultaneously damping vibration of all of the strings when plucked, the damping means absorbing sound generated by the strings when plucked.

2. A practice device as recited in claim 1, wherein the damping means comprises the first and second securing means and the tension adjusting means.

3. A practice device as recited in claim 2, wherein the damping means further comprises a sound-damping material simultaneously contacting all of the strings.

4. A practice device as recited in claim 1, wherein the damping means comprises a sound-damping material simultaneously contacting all of the strings.

5. A practice device as recited in claim 1, wherein the first and second securing means comprise bridges on the surface of the body.

6. A practice device as recited in claim 1, further comprising a storage compartment in the body.

7. A practice device as recited in claim 1, wherein the tension adjusting means is disposed in a recess in the body.

8. A practice device as recited in claim 1, wherein the tension adjusting means comprises bolts, each bolt securing a corresponding one of the strings to the body.

9. A practice device as recited in claim 8, further comprising a recess in the body, the bolts extending into the recess, the strings being routed from the front surface of the body, through the second securing means and the body, and into the recess where the strings are secured to the bolts.

10. A practice device comprising:

a body having a front surface and an oppositely-disposed rear surface, and a first end and an oppositely-disposed second end, the body lacking a sound hole and lacking an electric pickup at the front surface;
a fretless neck extending in a longitudinal direction from the first end of the body;
first bridge means on the front surface of the body near the first end thereof;
second bridge means on the front surface of the body near the second end thereof;
strings disposed in a longitudinal direction above the front surface of the body, the first bridge means securing a first end of each string and the second bridge means securing a second end of each string;
means associated with the second bridge means for adjusting tension of the strings; and
means for damping vibration of the strings when plucked, the damping means absorbing sound produced by the strings when plucked.

11. A practice device as recited in claim 10, wherein the damping means comprises the body, the first and second bridge means, and the tension adjusting means.

12. A practice device as recited in claim 11, wherein the damping means further comprises a sound-damping material simultaneously contacting all of the strings.

13. A practice device as recited in claim 12, wherein the sound-damping material is compressed between the strings and the second bridge means.

14. A practice device as recited in claim 10, wherein the damping means comprises a sound-damping material simultaneous contacting all of the strings.

15. A practice device as recited in claim 14, wherein the sound-damping material is compressed between the strings and the second bridge means.

16. A practice device as recited in claim 10, further comprising a storage compartment in the body.

17. A practice device as recited in claim 10, wherein the tension adjusting means is disposed in a recess in the body.

18. A practice device as recited in claim 10, wherein the tension adjusting means comprises bolts, each bolt securing a corresponding one of the strings to the body.

19. A practice device as recited in claim 18, further comprising a recess in the rear surface of the body, the bolts being disposed longitudinally and extending into the recess, the strings being routed from the front surface of the body, through the second bridge means and the body, and into the recess where the strings are secured to the bolts.

20. A practice device comprising:
a solid, nonresonant body having a front surface and an oppositely-disposed rear surface, and a first end and an oppositely-disposed second end, the body lacking a sound hole and lacking an electric pickup at the front surface;
a fretless tapered neck extending in a longitudinal direction from the first end of the body, the neck constituting about one-half the length of the practice device;
a first bridge block on the front surface of the body near the tapered neck;
a second bridge block on the front surface of the body near the second end thereof;
strings disposed in a longitudinal direction above the front surface of the body, the first bridge block securing a first end of each string and the second bridge block securing a second end of each string;

sound-damping material disposed between the second bridge block and the strings so as to simultaneously contact all of the strings, the sound-damping material damping vibration of the strings when the strings are plucked, the sound-damping material absorbing sound produced by the strings when plucked;

means associated with the second bridge means for adjusting tension of the strings; and a recess in the rear surface of the body, the tension adjusting means extending into the recess, the strings being routed from the front surface of the body, through the second bridge block and the body, and into the recess where the strings are secured to the tension adjusting means.

\* \* \* \* \*